United States Patent [19]
Evans

[11] Patent Number: 6,092,820
[45] Date of Patent: Jul. 25, 2000

[54] APPARATUS AND METHOD FOR TRANSPORTING CARGO WITH A TWO-WHEELED VEHICLE

[76] Inventor: Ross N. Evans, 3502 N. Stewart, Tucson, Ariz. 85716

[21] Appl. No.: 09/133,026

[22] Filed: Aug. 12, 1998

[51] Int. Cl.[7] .................................................. B62J 7/04
[52] U.S. Cl. ..................... 280/202; 280/288.4; 280/278; 280/287; 224/422; 224/429; 224/430
[58] Field of Search ............................... 224/422, 429, 224/430, 32 A; 280/288.4, 292, 304.5, 287, 202, 278, 288.1, 232

[56] References Cited

U.S. PATENT DOCUMENTS

| | | | |
|---|---|---|---|
| 3,575,436 | 4/1971 | Templeton | 224/422 |
| 3,786,972 | 1/1974 | Alley | 224/430 |
| 4,998,744 | 3/1991 | Drexler | 280/202 |
| 5,090,717 | 2/1992 | Belka | 280/304.5 |
| 5,285,639 | 2/1994 | Chen | 280/231 |
| 5,667,117 | 9/1997 | Nutto | 224/430 |

Primary Examiner—Brain L. Johnson
Assistant Examiner—Avraham H. Lerner
Attorney, Agent, or Firm—Albert O. Cota

[57] ABSTRACT

A cargo support device increases the cargo-carrying capacity of standard two-wheeled vehicles, such as bicycles, motorcycles, and mopeds. The cargo support device includes a base extension frame mounted to the two-wheeled vehicle. The base extension frame can be mounted to the bottom bracket shell or detachably mounted at three connection points to the bottom bracket shell or chainstays and rear wheel dropouts of the two-wheeled vehicle. The rear wheel assembly is transferred from its original dropouts to new dropouts located on the base extension frame. The original chain, rear brakes, and gear accessories, if any, are extended so as to accommodate the displacement of the rear wheel assembly of the two-wheeled vehicle. The cargo support device further includes a cargo storage device, such as a support frame with or without fold-down racks and at least one bag, vessel, container, lockable bin, or box-type attachment, or a long-load carrier, or a child seat, or a heavy-duty box-type compartment, which can be attached to the base extension frame.

12 Claims, 4 Drawing Sheets

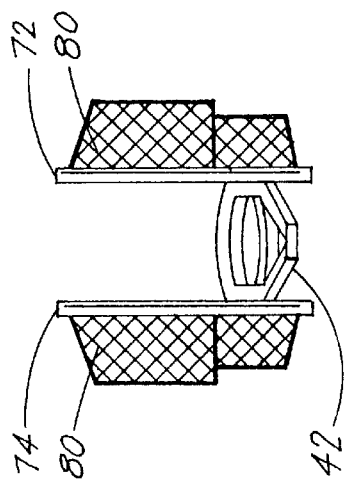
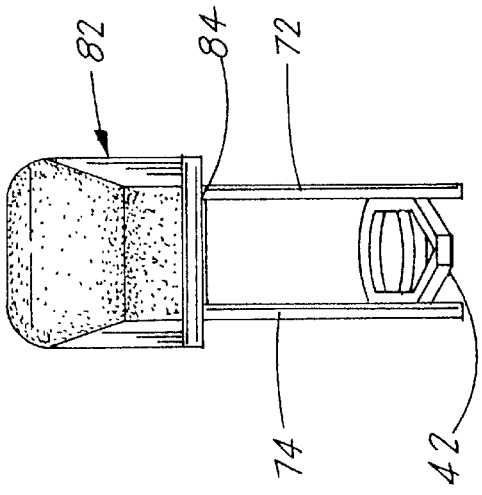
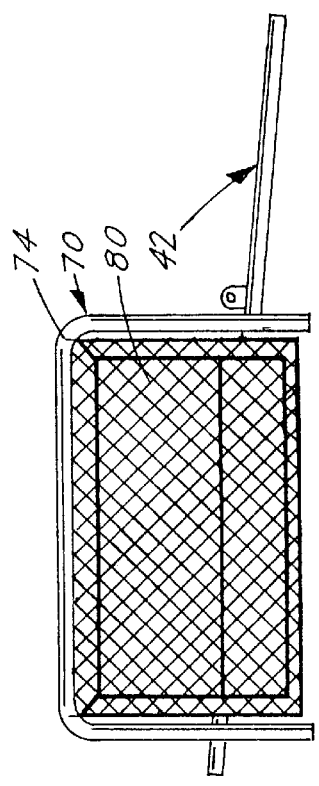
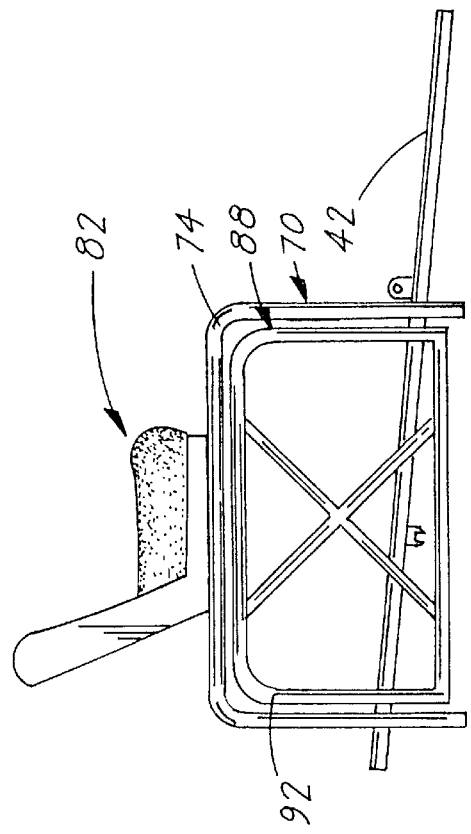

APPARATUS AND METHOD FOR TRANSPORTING CARGO WITH A TWO-WHEELED VEHICLE

BACKGROUND OF THE INVENTION

The present invention relates to transportation of cargo and, more particularly, to cargo transport by means of a two-wheeled vehicle. Specifically, one embodiment of the present invention provides an apparatus and method for modifying a human-powered or motorized two-wheeled vehicle, such as a bicycle, power-assisted bicycle, moped, or motorcycle, to convey any type of cargo, including human passengers, animals, or material.

In many regions of the world, two-wheeled vehicles are a primary means of transportation. For example, people ride bicycles to transport themselves from their residence to their place of work and to attend to errands, such as delivering children to a childcare facility on the route to their workplace, transporting groceries or other sundries from the place of purchase to their residence, conveying laundry or dry cleaning to and from a laundromat or cleaners, and to perform many other chores. Couriers also use bicycles to deliver documents and packages, and bicycles are used in the delivery of newspapers, groceries, prescription drugs, etc. People also ride bicycles for recreation and often need to carry cargo, such as a child, picnic meal, camping equipment, etc. Motorcycles and mopeds are also used for similar purposes, and power-assisted bicycles having an electric motor or gasoline engine to aid propulsion of the bicycle are also commercially available and gaining in popularity. An exemplary embodiment of the present invention will be described for a bicycle, but it will be understood that the principles of the invention apply to any type of two-wheeled vehicle.

Many devices are known for attachment to a two-wheeled vehicle for transportation of cargo. Child seats are available that can be mounted on a bicycle for accommodating an infant or small child as a passenger. Saddle bags constructed of a pliable material, such as water-resistant fabric or leather, can be attached by straps to a fender or frame of a bicycle. Hard-shell storage compartments can be mounted by brackets to the rear fender and frame. Also, small pouches mounted to handlebars with Velcro straps, holders for water bottles and tire pumps, and other specialized cargo transport devices for bicycles are commonplace.

Unfortunately, however, the amount of cargo that can be transported with known accessories mounted to two-wheeled vehicles is limited. In view of the widespread dependence by people on bicycles, mopeds, motorcycles, etc. for transportation, there has been a long-felt need for a two-wheeled vehicle that can convey a more substantial load than can presently be transported using available accessories. Furthermore, there is a need for such a cargo transport system using a two-wheeled vehicle, that is safe and reliable. The present invention fulfills this long-felt need by providing economical means to modify a two-wheeled vehicle to convey cargo in a safe and reliable manner.

SUMMARY OF THE INVENTION

The present invention provides a cargo transport system comprising a two-wheeled vehicle modified to provide a means for conveying cargo. The cargo transport system is adaptable to any two-wheeled vehicle, including bicycles (both conventional and power-assisted bicycles), mopeds, motorcycles, etc.

In accordance with the present invention, a cargo support device is provided, which is adapted to be used in combination with a two-wheeled vehicle comprising a rear portion and a rear wheel assembly. The cargo support device comprises an extension frame attachable to the rear portion of the two-wheeled vehicle and configured for remounting the rear wheel assembly of the two-wheeled vehicle to the extension frame; means for attaching the extension frame to the rear portion of the two-wheeled vehicle; and means for carrying cargo on the extension frame. The two-wheeled vehicle also typically comprises a chain mechanically coupled to the rear wheel assembly and brakes selectively mechanically coupled to the rear wheel assembly, and the cargo support device preferably further comprises means for extending the vehicle chain and brakes to the location of the extension frame configured for remounting the rear wheel assembly.

One embodiment of the present invention provides a cargo transport system comprising a standard bicycle having a frame including a bottom bracket and chainstays, a rear wheel assembly, means for mounting the rear wheel assembly, a chain mechanically coupled to the rear wheel assembly, and brakes selectively mechanically coupled to the rear wheel assembly. In accordance with one embodiment of the present invention, a cargo support device is provided for use in combination with the bicycle, comprising a base extension frame; means for attaching the base extension frame to the bottom bracket shell or chainstays; means for remounting the rear wheel assembly of the bicycle to the base extension frame; means for extending the bicycle chain to the remounted rear wheel assembly; means for extending the bicycle brakes to the remounted rear wheel assembly; and means for carrying cargo on the base extension frame. The standard bicycle may further comprise a gear selection mechanism, in which case the cargo support device further comprises means for extending the gear selection mechanism to the remounted rear wheel assembly.

In one preferred embodiment in accordance with the present invention, the base extension frame comprises two interconnected beams that extend from the bottom bracket shell of the bicycle to at least the means for remounting the rear wheel assembly of the bicycle to the base extension frame. In accordance with another preferred embodiment of the present invention, the means for attaching the base extension frame to the bicycle comprises three support points that serve as attachment points between the base extension frame and the bottom bracket shell or chainstays of the bicycle. Specifically, the means for mounting the rear wheel assembly of the standard bicycle preferably comprises two rear wheel dropouts, and two support points comprise vertical mounting plates attached to the base extension frame and mounting hardware for affixing the bicycle rear wheel dropouts to the base extension frame. Additionally, a third support point comprises means for attaching one end of the base extension frame to the bottom bracket shell or chainstays between the bottom bracket and the two rear wheel dropouts.

Also, the means for remounting the rear wheel assembly to the base extension frame preferably comprises two wheel dropout devices attached to the respective beams of the base extension frame. Additionally, the means for extending the bicycle chain comprises either additional chain links attached to the bicycle chain or a replacement chain having a length greater than the length of the replaced standard bicycle chain. Furthermore, the means for extending the bicycle brakes comprises the extended-length chain in the case of coaster brakes. Alternatively, the means for extending the bicycle brakes comprises either a cable extension or replacement rear wheel brake cables having a length greater than the length of the replaced standard bicycle brake cables in the case of other types of brakes. In the embodiment that further comprises a gear selection mechanism, the base extension frame preferably comprises two interconnected beams that extend from proximate to the bottom bracket of the bicycle to at least the means for mounting the rear wheel assembly of the bicycle, the means for remounting the rear wheel assembly of the bicycle to the base extension frame comprises two wheel dropout devices attached to the respective beams of the base extension frame, and the means for extending the gear selection mechanism comprises a derailleur hanger on one of the rear wheel dropout devices attached to the base extension frame, an additional length of derailleur cable, and an additional length of derailleur cable housing.

In accordance with one embodiment of the present invention, the means for carrying cargo on the base extension frame preferably comprises a support frame. In a preferred embodiment in accordance with the present invention, the support frame comprises two side frames interconnected by either cross support members or a top plate and attached to the base extension frame. The means for carrying cargo further comprises a storage device, for example, at least one bag, vessel, container, lockable bin, box-type attachment, long-load carrier, or child seat, attached to the support frame. Preferably, the means for carrying cargo further comprises two fold-down racks attached to the support frame for supporting cargo or the storage device containing cargo, and the fold-down racks comprise two platforms attached to the support frame by support links that allow the platforms to be folded up to a substantially vertical position parallel to the side frames or folded down to a substantially horizontal position perpendicular to the side frames. Alternatively, in accordance with another embodiment of the present invention, the means for carrying cargo on the base extension frame comprises a heavy-duty box-type compartment attached to the base extension frame, the bottom portion of the compartment being adapted to accommodate the rear wheel assembly remounted to the base extension frame.

The present invention also provides a method for transporting cargo. One embodiment of the method in accordance with the present invention comprises the steps of providing a two-wheeled vehicle having a rear wheel assembly; removing the rear wheel assembly; providing an extension frame for remounting the rear wheel assembly; mounting the extension frame to the two-wheeled vehicle; remounting the rear wheel assembly to the extension frame; providing a cargo storage device; and attaching the cargo storage device to the extension frame. The method enables cargo to be stowed using the cargo storage device for transport by the two-wheeled vehicle.

The present invention satisfies the long-felt need for a two-wheeled vehicle that can convey a more substantial load than can presently be transported using available accessories. Furthermore, the present invention in various embodiments provides an economical cargo transport system using a two-wheeled vehicle, that is safe and reliable.

BRIEF DESCRIPTION OF THE DRAWINGS

The above and other features and the concomitant advantages of the present invention will be better understood and appreciated by those skilled in the art in view of the description of the preferred embodiments given below in conjunction with the accompanying drawings. In the drawings:

FIGS. 5A and 5B are side and front elevation views, respectively, of the cargo support device shown in FIGS. 2–4 configured with detachable bags in accordance with one embodiment of the cargo transport system of the present invention;

FIGS. 6A and 6B are side and front elevation views, respectively, of the cargo support device shown in FIGS. 2–4 configured with a child seat in accordance with another embodiment of the cargo transport system of the present invention;

DETAILED DESCRIPTION OF THE PREFERRED EMBODIMENTS

The present invention provides a cargo transport system comprising a two-wheeled vehicle modified to provide a means for conveying cargo. The cargo transport system is adaptable to any two-wheeled vehicle, including bicycles (both conventional and power-assisted bicycles), motorcycles, mopeds, etc.

The cargo transport system includes a cargo support device which increases the cargo-carrying capacity of the two-wheeled vehicle. Generally, the cargo support device includes a base extension frame mounted to the two-wheeled vehicle. The base extension frame can be mounted to the bottom bracket shell or detachably mounted at three connection points to the bottom bracket shell or chainstays and rear wheel dropouts of the two-wheeled vehicle. The rear wheel assembly is transferred from its original dropouts to new dropouts located on the base extension frame. The original chain, rear brakes, and gear accessories, if any, are extended so as to accommodate the rearward displacement of the rear wheel assembly of the two-wheeled vehicle. The cargo support device further includes a cargo storage device, such as a support frame with or without fold-down racks and at least one bag, vessel, container, lockable bin, or box-type attachment, or a long-load carrier, or a child seat, or a heavy-duty box-type compartment, which can be attached to the base extension frame.

Considered in more detail, as indicated above, the cargo transport system in accordance with the present invention is adapted to increase the cargo-carrying capacity of two-wheeled vehicles, including bicycles, motorcycles, mopeds, or the like. One embodiment of the cargo transport system, generally indicated by the numeral 10 in FIG. 1, will be described by way of example and not by way of limitation for a standard bicycle 12. Bicycles and the nomenclature employed herein are described in *Bicycling Magazine's Complete Guide to Bicycle Maintenance and Repair Includ-* ing *Road Bikes and Mountain Bikes*, by the Editors of *Bicycling and Mountain Bike* Magazines, Rodale Press, Inc.: Emmaus, Pa. (1994), ISBN 0-87596-207-6, the disclosure of which is hereby incorporated herein by this reference in its entirety. It will be apparent to persons skilled in the art that the principles of the present invention apply to other types of two-wheeled vehicles as well.

Figure 1:
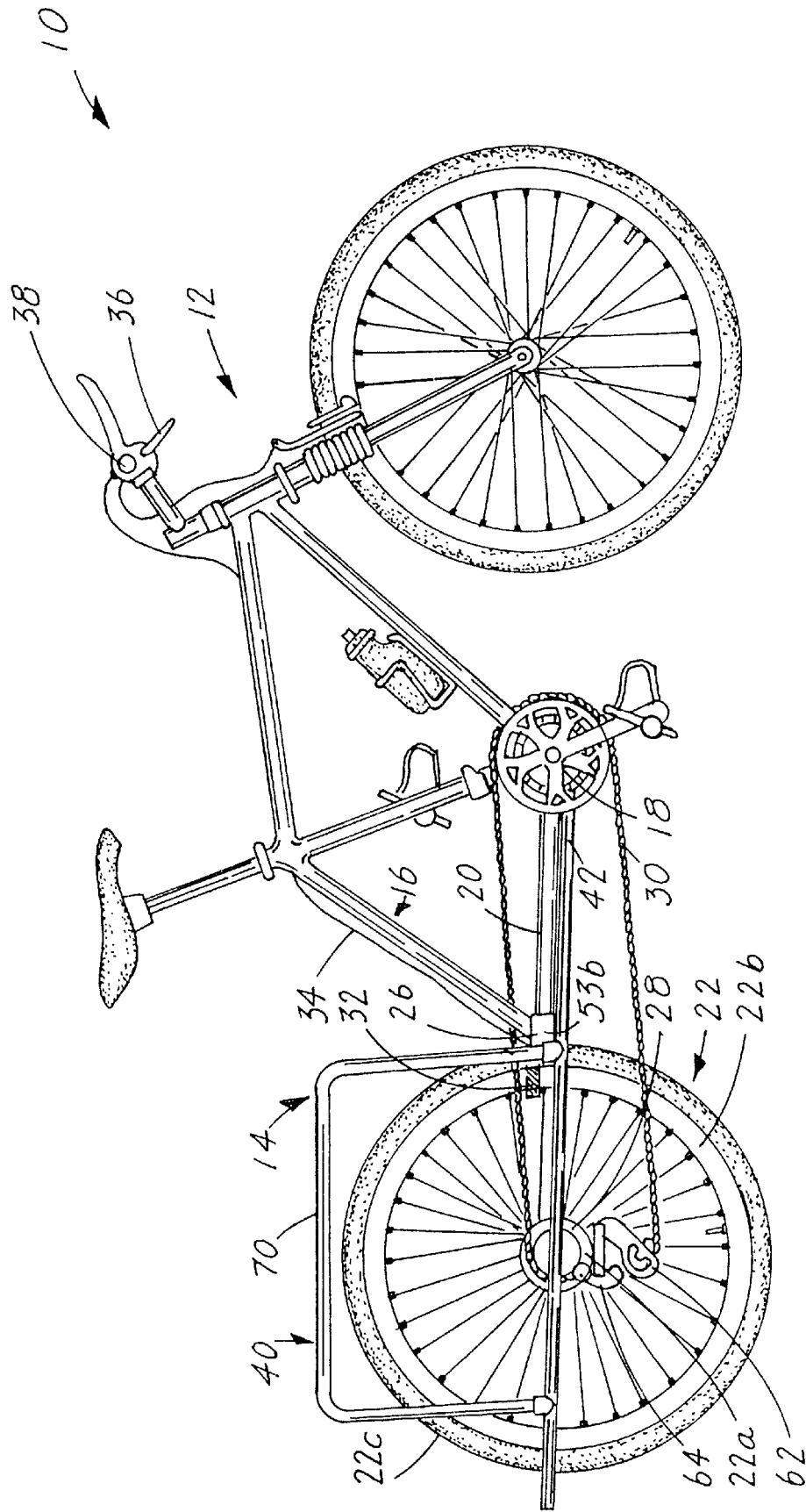
FIG. 1 illustrates a two-wheeled vehicle comprising a standard bicycle modified to provide a cargo transport system in accordance with the present invention.

As shown in FIG. 1, the bicycle 12 is modified in accordance with apparatus, generally indicated in FIG. 1 by the numeral 14, and a method in accordance with the present invention to provide the cargo transport system 10. For example, the apparatus 14 can provide a bicycle conversion kit that transforms the bicycle 12 into a low-cost cargo carrying vehicle.

Figure 2:
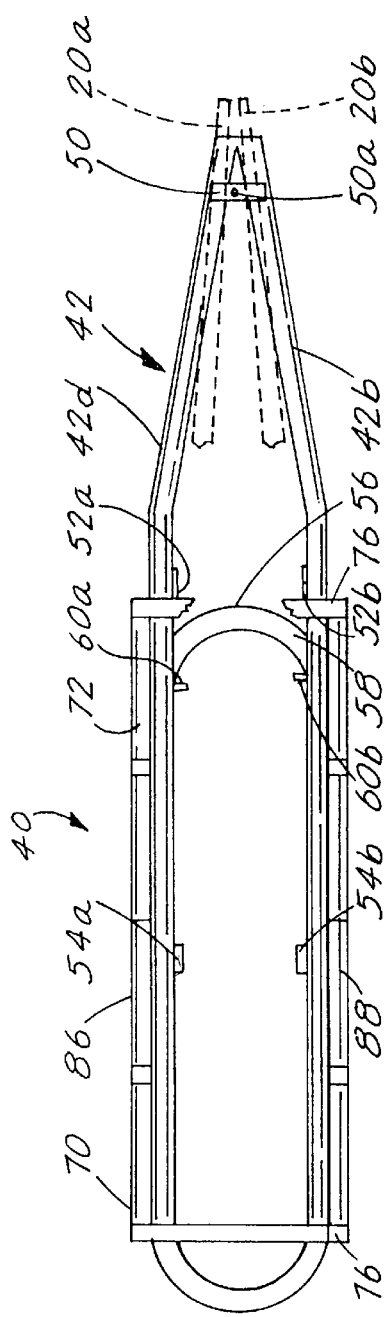
FIG. 2 is a top elevation view of a cargo support device in accordance with one embodiment of the present invention.

Considered in even greater detail, the bicycle 12 typically comprises a rear portion or frame 16 including a bottom bracket 18 and chainstays 20 typically constructed from two tubular elements 20a and 20b, as indicated in FIG. 2, which connect to the shell of the bottom bracket 18. For example, the tubular elements 20a and 20b can be welded to the shell of the bottom bracket 18. The tubular elements 20a and 20b are typically closely spaced at the juncture of the tubular elements and the shell of the bottom bracket 18.

As shown in FIG. 1, the bicycle 12 also comprises a rear wheel assembly 22. The rear wheel assembly 22 includes a freewheel or rear hub 22a, a rear wheel 22b comprising spokes and a rim, and a tire 22c. The rear wheel assembly 22 is detachably mounted to the bicycle 12 by means for mounting the rear wheel assembly which preferably includes rear wheel dropouts 26 for mounting the freewheel or rear hub 22a. The rear wheel assembly 22 also comprises at least one rear drive cog 28 for a bicycle chain 30 included in the bicycle 12, such that the chain is mechanically coupled to the rear wheel assembly.

Typically, the bicycle 12 includes rear brakes 32 selectively mechanically coupled to the rear wheel 22b comprising the rear wheel assembly 22. The rear brakes 32 can be any standard type of brakes, which typically include a brake cable 34 that extends from a brake lever 36 mounted on a handlebar 38 to the rear brakes in the case in which the bicycle 12 includes a freewheel 22a. Alternatively, some bicycles comprise coaster brakes, which is a chain-actuated brake system, that are built into the rear hub 22a so that the rear wheel 22b is braked when the pedals are moved in a counterclockwise direction as viewed in FIG. 1.

In accordance with one embodiment of the present invention, the apparatus 14 of the cargo transport system 10 comprises a cargo support device 40 used in combination with the bicycle 12. As shown in more detail in FIGS. 2–4, the cargo support device 40 comprises a base extension frame 42. The base extension frame 42 preferably comprises two interconnected beams 42a and 42b.

In one preferred embodiment, the two interconnected beams 42a and 42b are mounted to the shell of the bottom bracket 18 and extend from the bottom bracket of the bicycle 12 to at least the means for mounting the rear wheel assembly 22 of the bicycle shown in FIG. 1, such as the rear wheel dropouts 26. For example, the base extension frame 42 can be welded to the shell of the bottom bracket 18.

In another preferred embodiment, the base extension frame 42 is detachably mounted to the shell of the bottom bracket 18 or chainstays 20 of the bicycle 12. The means for attaching the base extension frame 42 to the shell of the bottom bracket 18 or chainstays 20 comprises three support points that serve as attachment points between the base extension frame 42 and the bottom bracket shell or chainstays of the bicycle 12. For example, the tubular elements 20a and 20b are typically closely spaced in the vicinity of their connection to the shell of the bottom bracket 18 to facilitate mounting the base extension frame 42 to the bicycle 12, as shown in FIG. 2. Preferably, the means for attaching the base extension frame 42 at a first support point comprises a plate 50 mounted to the base extension frame and a nut (not shown) threaded onto a bolt (not shown) extending between the tubular elements 20a and 20b comprising the chainstays 20 and a hole 50a in the plate for clamping the base extension frame to the tubular elements so that the base extension frame is mounted to the bicycle 12. Also, two additional support points for the base extension frame 42 preferably comprise vertical mounting plates 52a and 52b attached to the base extension frame and mounting hardware 53a and 53b for affixing the rear wheel dropouts 26 previously used for mounting the rear wheel assembly 22 of the bicycle 12 to the base extension frame. For example, the mounting hardware 53a and 53b can comprise bolts, washers, and nuts for bolting the rear wheel dropouts 26 to the vertical mounting plates 52a and 52b. The advantage of the alternate embodiment is that the base extension frame 42 is detachably mounted to the bicycle 12.

Additionally, the cargo support device 40 includes means for remounting the rear wheel assembly 22 of the bicycle 12 to the base extension frame 42. Preferably, the means for remounting the rear wheel assembly 22 to the base extension frame 42 comprises two wheel dropout devices 54a and 54b attached to the beams 42a and 42b, respectively, of the base extension frame, which are substituted for the original rear wheel dropouts 26. The rear wheel assembly 22 can therefore be dismounted from the rear wheel dropouts 26 and then remounted in the wheel dropout devices 54a and 54b after the cargo support device 40 is installed. In an exemplary embodiment, the cargo support device 40 extends the wheel base of the bicycle 12 approximately 14 inches (35.6 cm).

Before the cargo support device 40 is installed with the rear wheel assembly 22 remounted in the wheel dropout devices 54a and 54b, the bicycle chain 30 is reattached to the rear drive cog 28, as shown in FIG. 1. Since the rear wheel assembly 22 is displaced rearwardly from the original position, the bicycle chain 30 must be extended to engage the repositioned rear wheel drive cog 28. The cargo support system 10 therefore further comprises means for extending the bicycle chain 30 to the remounted rear wheel assembly 22. For example, the means for extending the bicycle chain 30 to the remounted rear wheel assembly 22 can comprise either additional chain links attached to the bicycle chain 30 or a replacement chain having a length greater than the length of the replaced bicycle chain or the like.

Because the rear wheel assembly 22 is relocated rearwardly from the initial position, the rear brakes 32 must typically be extended to the repositioned rear wheel 22b. The cargo support system 10 thus additionally typically comprises means for extending the rear brakes 32 to the remounted rear wheel assembly 22. In the case of coaster brakes, the brakes are extended to the relocated rear wheel assembly 22 when the chain 30 is extended. In the case of other types of brakes, the means for extending the bicycle brakes can typically comprise, for example, either a cable extension to the brake cable 34 or replacement rear wheel brake cables having a length greater than the length of the replaced bicycle brake cables or the like.

For example, one type of brakes is cantilever brakes, which are described in *Bicycling Magazine's Complete Guide to Bicycle Maintenance and Repair Including Road Bikes and Mountain Bikes* on pages 250–251. In the case in which the bicycle 12 comprises cantilever brakes, the base extension frame 42 further comprises a pulley 56 mounted on a horizontal cross support member 58 linking the two beams 42a and 42b of the base extension frame and two studs or cantilever pivot posts 60a and 60b attached to the base extension frame, on which the cantilever brakes can be remounted.

Additionally, as indicated above, the bicycle 12 can comprise gear accessories. That is, the bicycle 12 can incorporate a gear selection mechanism. In this situation, since the rear wheel assembly 22 is repositioned rearwardly from the original position, the cargo support system 10 further comprises means for extending the gear selection mechanism to the remounted rear wheel assembly 22. For example, the means for remounting the rear wheel assembly 22 of the bicycle 12 to the base extension frame 42 can comprise wheel dropout devices 54a and 54b, described above, attached to the respective beams 42a and 42b of the base extension frame, and the means for extending the gear selection mechanism can comprise a derailleur hanger 62 mounted on one of the rear wheel dropout devices attached to the base extension frame, an additional length of derailleur cable, and an additional length of derailleur cable housing 64, as shown in FIG. 1.

As indicated above, the cargo support device 40 also includes means for carrying cargo on the base extension frame 42. There are a number of markets in third world countries as well as delivery services in urban areas of developed countries to which the expanded cargo transport capability of the cargo transport system 10 is addressed.

Figure 4:
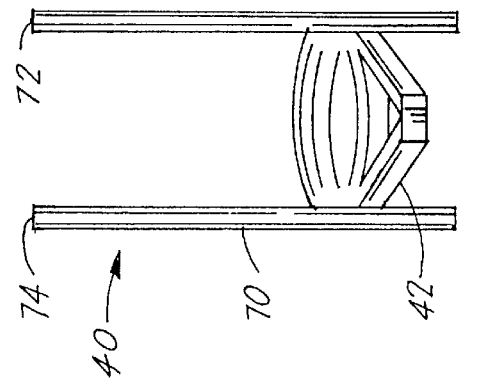
FIG. 4 is a front elevation view of the cargo support device along the line 3—3 shown in FIG. 3.
Figure 3:
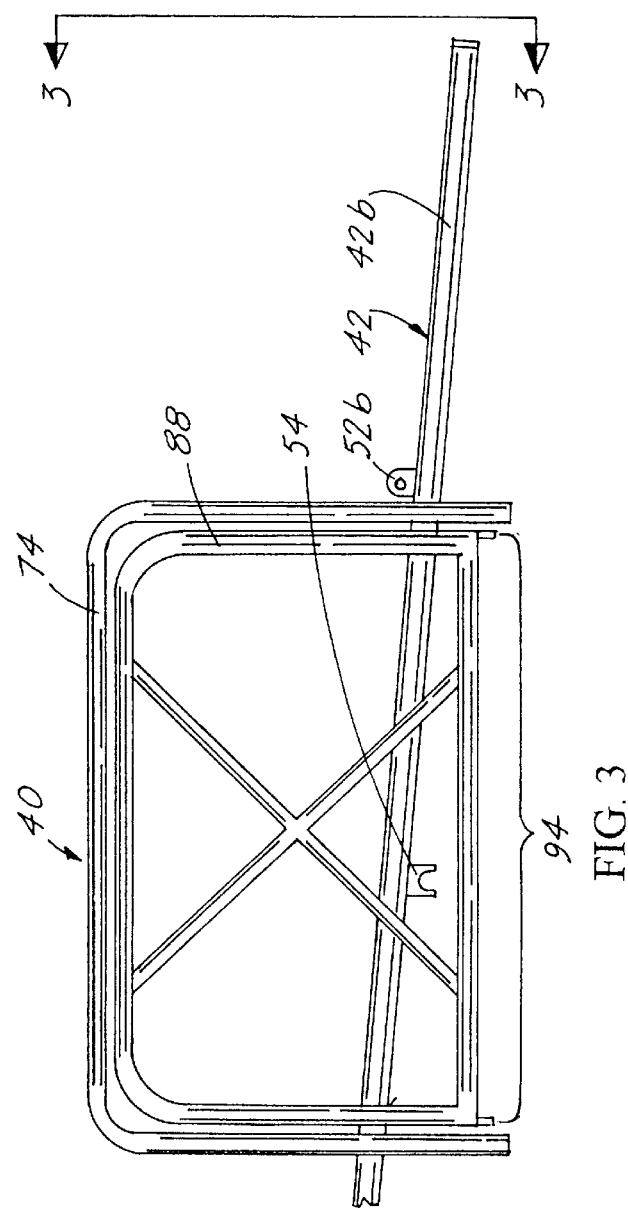
FIG. 3 is a side elevation view of the cargo support device shown in FIG. 2.

As shown in FIGS. 2–4, the means for carrying cargo comprises at least a support frame 70. Preferably, the support frame 70 comprises a first side frame 72 and a second side frame 74. The side frames 72 and 74 are mounted to the base extension frame 42 and are also preferably interconnected by one or more cross support members 76 to increase rigidity of the support frame 70. Alternatively, the side frames 72 and 74 can be interconnected by a top plate to increase rigidity of the support frame 70, as well as to provide a platform on which storage devices can be attached or long loads can be carried, as will be described in more detail later.

The means for carrying cargo can also further comprise detachable bags 80 attached to one or both of the side frames 72 and 74, as shown in FIGS. 5A and 5B. The detachable bags 80 can be constructed from water-resistant fabric or leather, for example. The detachable bags 80 can be attached to the side frames 72 and 74 by belts, Velcro straps, buckles, pins, or bolts (not shown), as will be readily understood by persons skilled in the art.

Alternatively, as will be understood from FIGS. 5A and 5B, the means for carrying cargo may comprise storage devices other than bags 80 attached to one or both of the side frames 72 and 74. For example, the storage devices can be bins, such as lockable bins for securely stowing and transporting wares; vessels for carrying liquid, such as water, or granular material, such as grain, seed, fertilizer, etc.; containers for various material, such as food or medical supplies; or open-top or closed-toped box-type attachments, such as toolboxes. These storage devices can be constructed from fiberglass or metal, for example, and can be attached to the side frames 72 and 74 by clips or brackets, as will also be readily understood by persons skilled in the art. It is contemplated that one type of storage device can be mounted to the first side frame 72 and another type of storage device can be mounted on the second side frame 74. It is desirable, but not essential, that the load on the side frames 72 and 74 is approximately balanced.

As shown in FIGS. 6A and 6B, the means for carrying cargo can also further comprise a child seat 82 mounted atop the side frames 72 and 74. Preferably, the side frames 72 and 74 are interconnected by a top plate 84 both to provide rigidity and to prevent the legs and feet of a child passenger from contacting the remounted rear wheel 22b of the bicycle 12. Alternatively, the child seat 82 can be removed, and a wide or heavy load, such as an ice chest, or long loads, such as lumber, tubing, kayaks, surfboards, etc., can be removably secured by elastic cords having hooks attached to their respective ends or the like atop the top plate 84 for transport.

Figure 7B:
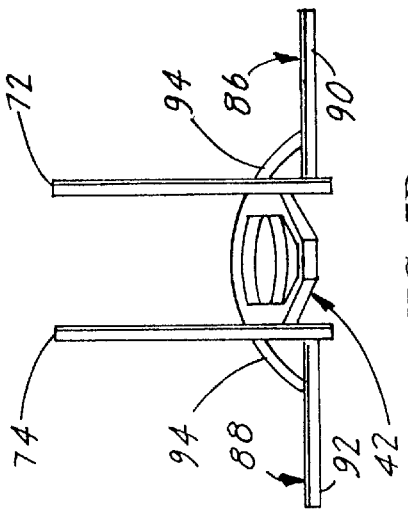
FIGS. 7A and 7B are side and front elevation views, respectively, of the cargo support device shown in FIGS. 2–4 configured only with fold-down racks in accordance with yet another embodiment of the cargo transport system of the present invention.
Figure 7A:
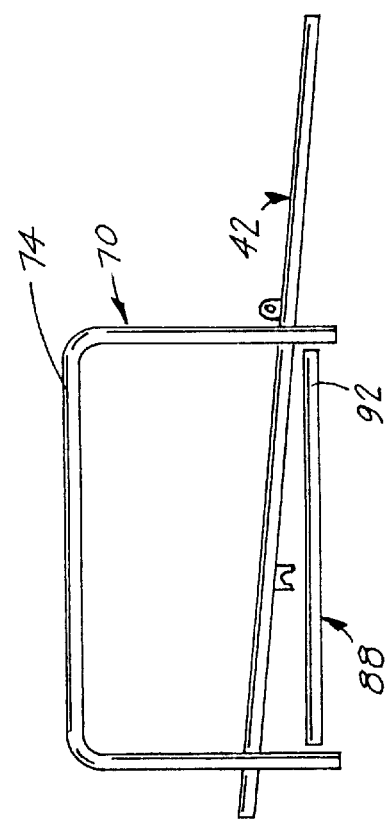

Additionally, as shown in FIGS. 2–3, 6A, 7A, and 7B, the means for carrying cargo can further comprise a first fold-down rack 86 and a second fold-down rack 88 attached to the first and second side frames 72 and 74 of the support frame 70, respectively. The fold-down racks 86 and 88 preferably comprise two platforms 90 and 92 attached to the support frame 70 by support links 94 that allow the platforms to be folded up to a substantially vertical position parallel to the side frames 72 and 74, as shown in FIGS. 2–4, 6A, and 6B, or folded down to a substantially horizontal position perpendicular to the side frames, as shown in FIGS. 7A and 7B.

Material, such as luggage, can be secured to the fold-down racks 86 and 88. Also, the at least one bag 80 or alternative storage devices, such as bins, vessels, containers, or open-top or closed-toped box-type attachments, can be mounted on the fold-down racks 86 and 88 to provide support under those storage devices.

Figure 8B:
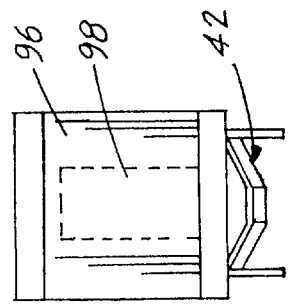
FIGS. 8A and 8B are side and front elevation views, respectively, of a modified cargo support device configured with a heavy-duty box-type compartment in accordance with an additional embodiment of the cargo transport system of the present invention.
Figure 8A:
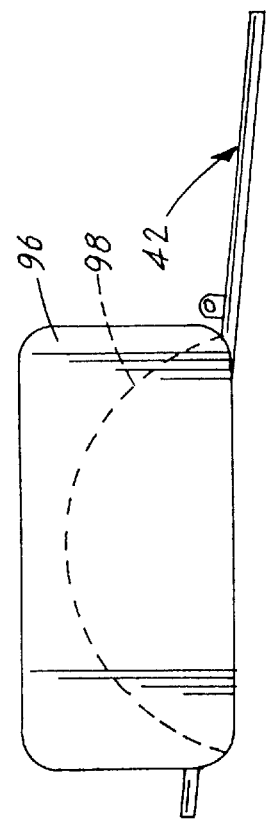

Alternatively, the means for carrying cargo on the base extension frame 42 can comprise a heavy-duty box-type compartment 96 attached directly to the base extension frame, as shown in FIGS. 8A and 8B. For example, the box-type compartment 96 can be bolted to the base extension frame 42. The bottom portion of the box-type compartment 96 is adapted to accommodate the rear wheel assembly 22 remounted to the base extension frame 42 by providing a wheel well 98 shown in dotted lines in FIGS. 8A and 8B, for example.

The present invention also provides a method for transporting cargo. The method comprises the steps of: providing a two-wheeled vehicle, such as the bicycle 12, having a rear wheel assembly 22; removing the rear wheel assembly 22; providing an extension frame, such as the base extension frame 42, for remounting the rear wheel assembly 22; mounting the extension frame to the two-wheeled vehicle; remounting the rear wheel assembly 22 to the extension frame; providing a cargo storage device, such as at least one bag 80 or other storage device; and attaching the cargo storage device to the extension frame; thereby enabling cargo to be placed in the cargo storage device for transport by the two-wheeled vehicle.

Although the various embodiments of the cargo support device 40 and cargo transport system 10 in accordance with the present invention have been described in connection with the bicycle 12, it will be readily understood by those skilled in the art that the principles of the invention apply generally to two-wheeled vehicles including rear-drive bicycles, as described, as well as front-drive bicycles, power-assisted bicycles, motorcycles, mopeds, and the like. Various modifications will be apparent to persons skilled in the art. For example, the base extension frame 42 can be detachably mounted to the bottom bracket 18 by a clamping system. Also, an additional connector, such as a bracket, slot, catch, etc., can be mounted to the shell of the bottom bracket 18 or to the chainstays 20 proximate to the bottom bracket shell, and the base extension frame 42 can in turn be mounted to the additional connector. In the case of either of these modifications, the base extension frame 42 is preferably additionally mounted to the rear wheel dropouts 26. The specification and drawings are, accordingly, to be regarded in an illustrative rather than in a restrictive sense. The present invention should not be construed as limited by illustrated embodiments and examples, but rather construed according to the following claims.

What is claimed is:

1. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
    a) a base extension frame,
    b) means for attaching the base extension frame to the bicycle frame,
    c) means for remounting the rear wheel assembly of the bicycle to the base extension frame,
    d) means for extending the bicycle chain to the remounted rear wheel assembly,
    e) means for extending the bicycle brakes to the remounted rear wheel assembly,
    f) means for carrying cargo on the base extension frame, and
    g) a gear selection mechanism having means for extending the gear selection mechanism to the remounted rear wheel assembly.

2. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
    a) a base extension frame comprising two interconnected beams that extend from proximate to the bottom bracket shell of the bicycle to at least the means for mounting the rear wheel assembly of the bicycle,
    b) means for attaching the base extension frame to the bicycle frame,
    c) means for remounting the rear wheel assembly of the bicycle to the base extension frame,
    d) means for extending the bicycle chain to the remounted rear wheel assembly,
    e) means for extending the bicycle brakes to the remounted rear wheel assembly, and
    f) means for carrying cargo on the base extension frame.

3. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
    a) a base extension frame,
    b) means for attaching the base extension frame to the bicycle frame,
    c) means for remounting the rear wheel assembly of the bicycle to the base extension frame,
    d) means for extending the bicycle chain to the remounted rear wheel assembly,
    e) means for extending the bicycle brakes to the remounted rear wheel assembly, comprises one of:
        (1) a cable extension and
        (2) replacement rear wheel brake cables having a length greater than the length of the replaced bicycle brake cables, wherein when the bicycle comprises cantilever brakes, the base extension frame comprises two interconnected beams that extend from proximate to the bottom bracket of the bicycle to at least the means for mounting the rear wheel assembly of the bicycle, and the cable extension comprises a pulley mounted on a horizontal cross support member linking the two beams of the base extension frame and two cantilever pivot posts attached to the base extension frame, and
    f) means for carrying cargo on the base extension frame.

4. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
    a) a base extension frame comprising two interconnected beams that extend from proximate to the bottom bracket shell of the bicycle to at least the means for mounting the rear wheel assembly of the bicycle, wherein the means for remounting the rear wheel assembly to the base extension frame comprises two wheel dropout devices attached to the respective beams of the base extension frame, and
    b) means for attaching the base extension frame to the bicycle frame,
    c) means for remounting the rear wheel assembly of the bicycle to the base extension frame,
    d) means for extending the bicycle chain to the remounted rear wheel assembly,
    e) means for extending the bicycle brakes to the remounted rear wheel assembly, and
    f) means for carrying cargo on the base extension frame.

5. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
    a) a base extension frame,
    b) means for attaching the base extension frame to the bicycle frame,
    c) means for remounting the rear wheel assembly of the bicycle to the base extension frame,
    d) means for extending the bicycle chain to the remounted rear wheel assembly,
    e) means for extending the bicycle brakes to the remounted rear wheel assembly, and
    f) means for carrying cargo on the base extension frame, and
    g) a gear selection mechanism having means for extending the gear selection mechanism to the remounted rear wheel assembly, wherein the means for remounting the rear wheel assembly of the bicycle to the base extension frame comprises two wheel dropout devices attached to the respective beams of the base extension frame and the means for extending the gear selection mechanism comprises a derailleur hanger on one of the rear wheel dropout devices attached to the base extension frame, an additional length of derailleur cable, and an additional length of derailleur cable housing.

6. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
 a) a base extension frame,
 b) means for attaching the base extension frame to the bicycle frame, wherein the means for attaching the base extension frame to the bicycle frame comprises means for attaching the base extension fame to the bottom bracket shell,
 c) means for remounting the rear wheel assembly of the bicycle to the base extension frame,
 d) means for extending the bicycle chain to the remounted rear wheel assembly,
 e) means for extending the bicycle brakes to the remounted rear wheel assembly, and
 f) means for carrying cargo on the base extension frame.

7. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
 a) a base extension frame,
 b) means for attaching the base extension frame to the bicycle frame comprises three support points that serve as attachment points between the base extension frame and one of:
  (1) the bottom bracket shell and
  (2) the chainstays of the bicycle, wherein the support points comprise means for attaching one end of the base extension frame, that serves as a connection point ot one of:
  (1) the bottom bracket shell and
  (2) at least one of the bicycle chainstays,
 c) means for remounting the rear wheel assembly of the bicycle to the base extension frame,
 d) means for extending the bicycle chain to the remounted rear wheel assembly,
 e) means for extending the bicycle brakes to the remounted rear wheel assembly, and
 f) means for carrying cargo on the base extension frame.

8. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
 a) a base extension frame,
 b) means for attaching the base extension frame to the bicycle frame,
 c) means for remounting the rear wheel assembly of the bicycle to the base extension frame,
 d) means for extending the bicycle chain to the remounted rear wheel assembly,
 e) means for extending the bicycle brakes to the remounted rear wheel assembly, and
 f) means for carrying cargo on the base extension frame comprising a support frame, further comprising two fold-down racks attached to the support frame.

9. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
 a) a base extension frame,
 b) means for attaching the base extension frame to the bicycle frame,
 c) means for remounting the rear wheel assembly of the bicycle to the base extension frame,
 d) means for extending the bicycle chain to the remounted rear wheel assembly,
 e) means for extending the bicycle brakes to the remounted rear wheel assembly, and
 f) means for carrying cargo on the base extension frame comprises a support frame having two fold-down racks attached to the support frame, wherein the fold-down racks comprise two platforms attached to the support frame by support links that allow the platforms to be folded up to a substantially vertical position parallel to the side frames or folded down to a substantially horizontal position perpendicular to the side frames.

10. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:
 a) a base extension frame,
 b) means for attaching the base extension frame to the bicycle frame,
 c) means for remounting the rear wheel assembly of the bicycle to the base extension frame,
 d) means for extending the bicycle chain to the remounted rear wheel assembly,
 e) means for extending the bicycle brakes to the remounted rear wheel assembly, and
 f) means for carrying cargo on the base extension frame comprises a support frame having two fold-down racks attached to the support frame wherein the fold-down racks comprise two platforms attached to the support frame by support links that allow the platforms to be folded up to a substantially vertical position parallel to the side frames or folded down to a substantially horizontal position perpendicular to the side frames, wherein the means for carrying cargo further comprises a storage device selected from among the group of storage devices consisting of at least one bag, vessel, container, bin, box-type attachment, long-load carrier and child seat attached to the support frame.

11. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:

a) a base extension frame,
b) means for attaching the base extension frame to the bicycle frame,
c) means for remounting the rear wheel assembly of the bicycle to the base extension frame,
d) means for extending the bicycle chain to the remounted rear wheel assembly,
e) means for extending the bicycle brakes to the remounted rear wheel assembly, and
f) means for carrying cargo on the base extension frame wherein the means for carrying cargo on the base extension frame comprises a heavy-duty box-type compartment attached to the base extension frame, the bottom portion of the compartment being adapted to accommodate the rear wheel assembly remounted to the base extension frame.

12. A cargo support device used in combination with a standard bicycle comprising a frame including a bottom bracket and chainstays, a rear wheel assembly, means for mounting the rear wheel assembly, a chain mechanically coupled to the rear wheel assembly, and brakes selectively mechanically coupled to the rear wheel assembly, the device comprising:

a) a base extension frame, b) means for attaching the base extension frame to the bicycle frame, c) means for remounting the rear wheel assembly of the bicycle to the base extension frame, d) means for extending the bicycle chain to the remounted rear wheel assembly, by adding additional chain links to the bicycle chain or procuring a replacement chain having a length greater than the length of the replaced bicycle chain, e) means for extending the bicycle brakes to the remounted rear wheel assembly by adding a cable extension or procuring a replacement rear wheel brake cable having a length greater than the length of the replaced bicycle brake cable, and f) means for carrying cargo on the base extension frame.

* * * * *